3,535,961
MACHINE TOOL APPARATUS
Royds Sharp and Malcolm Bath, East Kilbride, Glasgow, Scotland, assignors to National Research Development Corporation, London, England, a British corporation
Filed July 24, 1967, Ser. No. 655,400
Claims priority, application Great Britain, July 27, 1966, 33,828/66
Int. Cl. B23b 7/02
U.S. Cl. 82—2                        9 Claims

ABSTRACT OF THE DISCLOSURE

A lathe provided with two fluid pressure proximity gauges sensing portions of the workpiece surface at opposite ends of a diameter of the workpiece. The gauges are moved towards and away from the workpiece surface in unison with movement of the tool holder whereby the distance between each gauge and the workpiece surface is kept substantially constant. The gauges are used to provide a signal indicative of a discrepancy of the size of the workpiece surface from that size which would be separated from the positions of the gauges and hence of the tool holder. Means are provided for moving the tool in the tool holder in response to an error signal derived from the gauges.

---

Figure 1:
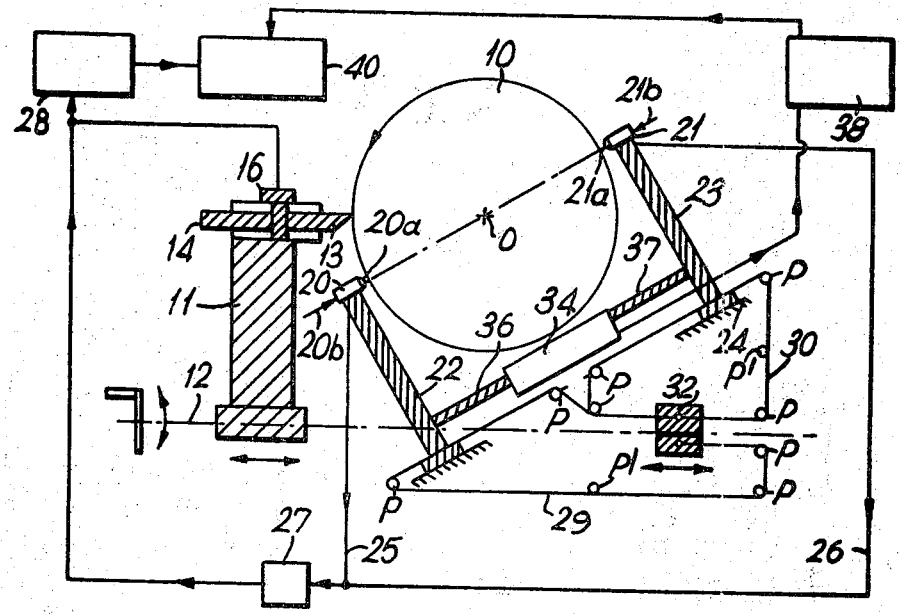

This invention relates to machine tool apparatus.

According to the invention there is provided machine tool apparatus comprising a tool holder, a workpiece holder in which a workpiece may be rotated relative to a tool held in said tool holder, first and second fluid pressure proximity gauges so disposed that each of the gauges senses a different portions of the surface of the workpiece, each of the proximity gauges providing an output signal indicative of the distance between itself and the portion of the workpiece surface sensed by it, means utilising said output signals to indicate errors in the size of the workpiece, and means interconnecting the tool holder and the proximity gauges so that, in operation, as the tool holder is advanced towards a workpiece, the proximity gauges are advanced in unison towards the sensed portions of the workpieces surface so as to maintain the distances between the proximity gauges and the sensed portions of the workpiece surface substantially constant.

With embodiments of the present invention it is possible to monitor and/or control the machining of a workpiece continuously during machining of a workpiece, the proximity gauges being adjusted in position automatically as the tool advances into the workpiece.

Means may be provided for controlling the position of the tool in the tool holder in dependence upon an error signal derived from the means utilising the output signals of the proximity gauges. The said means utilising said output signals preferably effect summation of the two output signals of the proximity gauges and compare the summed signals with a reference signal to produce an error signal.

Said means interconnecting the tool holder and the proximity gauges comprise, according to one embodiment of the invention, at least one tape, belt or like flexible member so connected to the proximity gauges and to the tool holder, that, in operation, as the tool holder is advanced towards a workpiece the proximity gauges are advanced in unison. In another embodiment, the interconnecting means comprise a screw-thread connection between the two proximity gauges and a cross feed for the tool holder.

Displacement transducer means may be so connected to the proximity gauges that there is provided a continuous indication of the distance between the proximity gauges and, therefore, of the size of the workpiece. Said displacement transducer means may comprise a moiré fringe device, that is, a device which produces an indication of changes in the relative position of two members by movements of a moiré fringe pattern produced between respective gratings which move with the respective members. Alternatively a fluidic displacement measuring device may be used as the displacement transducer means. Such a system is described in U.S. Pat No. 3,456,570.

Recording means may be provided to produce a continuous record of the magnitude of said error signal and the concurrent indications of the displacement transducer means.

Each of the proximity gauges may comprise a capillary tube having an open end to be located in spaced relationship with the surface of the workpiece, means for supplying fluid under pressure to said capillary tube whereby fluid is directed from the said open end on to said surface through the open end thereof and means connected to said capillary tube for sensing the fluid pressure or changes in the fluid pressure at a predetermined point in the capillary tube adjacent the open end thereof. Such a proximity gauge is described, for example, in U.S. application Ser. No. 666,083, filed Sept. 7, 1967, or U.S. application Ser. No. 728,256, filed May 9, 1968.

Means connected to the capillary tube for sensing the fluid pressure or changes in the fluid pressure may include a pressure transducer providing an electrical signal indicative of the fluid pressure. Alternatively, the output signals may be fluid pressure signals.

Figure 2:
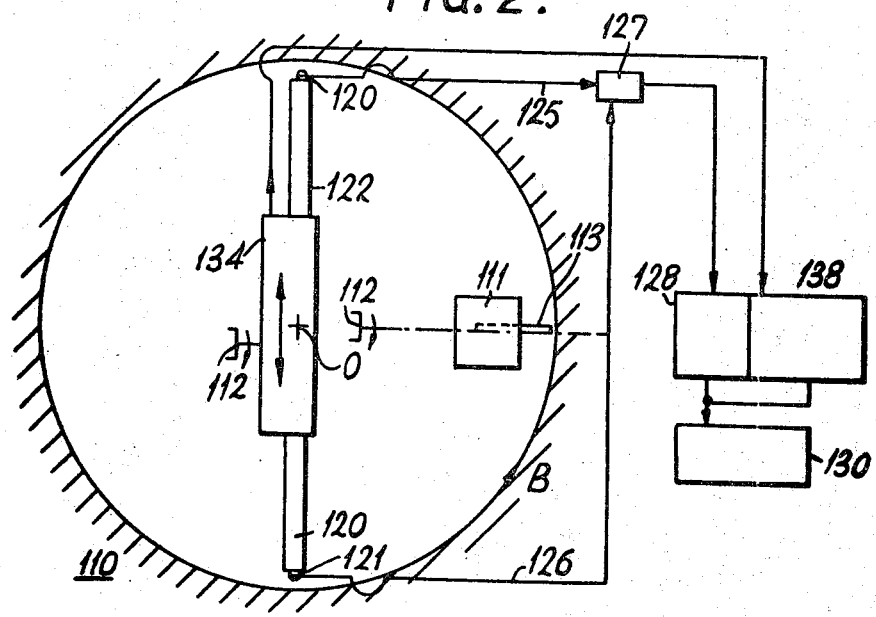

The invention will now be described, by way of example, with reference to the accompanying drawings, in which:

FIG. 1 illustrates diagrammatically machine tool apparatus according to one embodiment of the invention, and FIG. 2 illustrates diagrammatically machine tool apparatus according to another embodiment of the invention.

FIG. 1 illustrates machine tool apparatus in the form of a lathe. A workpiece 10 is mounted in a workpiece holder (not shown) for rotation in the direction indicated by arrow A about an axis 0. A tool holder 11 is mounted on the bed of the lathe and may be moved towards and away from the workpiece by means of a cross feed drive 12, indicated by a chain-dotted line. A a tool 13 is shown mounted in the tool holder 11 for machining the surface of the rotating workpiece 10.

The position of the tool 13 in the tool holder 11 may be adjusted in the direction of the cross feed drive 12 by means of a double-acting hydraulic ram 14 to which the tool 13 is attached. Hydraulic fluid is supplied to either side of the ram 14 from a supply pipe 15 by way of an electrically operated control valve 16 to advance or retract the tool 13 with respect to the tool holder 12 as required.

Two fluid pressure proximity gauges 20, 21 are mounted adjacent diametrically opposite parts of the surface of the workpiece 10 on respective support members 22, 23. The support members 22, 23 are mounted for movement selectively towards and away from each other on a slide 24 which is disposed parallel to an imaginary line passing through the two proximity gauges 20, 21.

Each of the proximity gauges 20, 21 comprises a conduit (not shown) having an open end 20a, 21a disposed adjacent a respective portion of the surface of the workpiece 10 and separated therefrom by a small gap. The conduit is supplied with fluid under pressure, in this case compressed air, from a respective supply duct 20b, 21b and the fluid pressure in the conduit adjacent said open end 20a, 21a thereof is indicated, either directly as a fluid pressure output signal, or indirectly as an electrical signal produced by a pressure transducer exposed to the pressure in the conduit close to said open end thereof. The respective output signals are dependent on the magnitudes of the gaps between the respective open ends 20a, 21a and the workpiece surface and, therefore, of the respective distances of the proximity gauges 20, 21 from said surface. A suitable form of fluid pressure proximity gauge is described in U.S. pat. application Ser. No. 666,083, filed Sept. 7, 1967.

The said output signals from the proximity gauges 20, 21 are passed through lines 25, 26, respectively, to a common input of a summing device 27. The summing device 27 is adapted to produce an error signal which is dependent on the sum of the two output signals from the respective proximity gauges 20, 21 as compared with a standard "reference" signal. In the case of proximity gauges 20, 21 which provide electrical output signals, as illustrated, the summing device 27 is a summing amplifier, the "reference" signal being a predetermined voltage and the "error" signal being electrical. Where the output signals from the respective proximity gauges are fluid pressure signals the summing device 27 may be, for example, a pneumatic summator, such as a beam balance or W-manometer, the resultant error signal being a pressure signal. In either case, the error signal from the summing device 27 is representative of the departure of the workpiece size from a predetermined size, represented by the "reference" signal.

The error signal from the summing device 27 is utilised to operate the control valve 16 of the hydraulic ram 14, and is also passed to an error indicator 28. Thus the tool 13 is adjusted in the tool holder 11, thereby adjusting the depth of the cut made in the workpiece 10, in dependence on the error signal. The arrangement constitutes a simple servo-system and is so arranged that it has negative feedback, that is, the tool is adjusted by the ram 14 in response to an error signal so as to change the depth of cut in such a way as to reduce the magnitude of the error signal.

The error signal arises as a result, for example, of tool wear but since it is obtained from the summation, or effective averaging, of two proximity gauge signals obtained from gauges disposed diametrically opposite each other on a diameter which is displaced by a small angular amount in the direction of workpiece rotation from the diameter on which the tool is located, the error signal is inherently compensated for other errors due, for example, to eccentric mounting of the workpiece 10 in the workpiece holder. The servo-system described above is therefore operative to adjust the position of the tool 13 automatically to take up any wear therein.

As machining of the workpiece 10 proceeds, the tool holder 11 is advanced by the cross feed 12 towards the workpiece 10. In order that the above described servo-system may continue to function properly, the respective proximity gauges 20, 21 are maintained at substantially constant distances from the surface of the workpiece 10 as the latter is machined. This is achieved by means of a mechanical interconection between the cross fed 12 of the tool holder 11 and the proximity gauge support members 22, 23. Thus, in the embodiment illustrated in FIG. 1, the support members 22, 23 may be moved towards or away from each other on the slide 24 by means of flexible tensile force transmitting members which in the present case are steel tapes 29, 30 to which the support members 22, 23, respectively, are attached. The tapes 29, 30 pass around fixed pulleys P, the ends of the tapes 29, 30 being secured to a nut member 32 which is driven by the cross feed drive 12 in unison with the tool holder 11. Adjustable tensioning rollers P' are provided for maintaining a tension in each of the tapes 29, 30.

With the arrangement of the tapes 29, 30 as illustrated, the support members 22, 23 are moved towards each other in unison when the tool holder 11 is advanced towards the workpiece 10 by the cross fed 12, likewise, the support members 22, 23 are moved away from each other in unison when the tool holder 11 is retracted from the workpiece 10. Since the nut member 32 and the tool holder 11 are driven by the common cross feed drive 12, it is ensured that the tool 13 advances towards the workpiece 10 by the same amounts as the proximity gauges 20, 21. The error indicator 28 therefore provides a continuous indication of errors in the size of the workpiece 10 as machining thereof proceeds, while at the same time the above-described servo-system makes continuous adjustment of the relative position of the tool 13 in the tool holder 11 to compensate for tool wear.

A displacement transducer of the moiré fringe type is arranged to provide an indication of relative displacement of the proximity gauges 20, 21 and, hence, of the size of the workpiece 10. The transducer device 34 comprises two ruled gratings (not shown), the sets of rulings on the gratings being inclined at a small angle with respect to one another. One of the gratings is attached by a connecting member 36, indicated diagrammatically, to the proximity gauge support member 22, and the other grating is attached by a connecting member 37 to the proximity support member 23. Relative movement of the proximity gauges 20, 21 produces magnified movement of the moiré fringe pattern formed between said two gratings, and this movement may be translated into an electrical signal recorded on a size indicator 38. In order to get a correct reading on the indicator 38, a cut is made on the workpiece and the diameter of the cut surface is measured. The indicator 38 is adjusted to the measured value of the diameter and henceforth, when there is no error signal, the indicator 38 provides a correct indication of the workpiece diameter.

A suitable form of moiré fringe displacement transducer is described in U.S. pat. application Ser. No. 597,966, filed Nov. 30, 1966.

It may be found desirable to use a fluidic type of displacement transducer instead of the moiré fringe type of transducer. A suitable form of fluidic displacement transducter is described in U.S. Pat. No. 3,456,570 wherein there is described a transducer comprising a pneumatic gauge and a regularly slotted, corrugated or like scale member arranged for relative movement therebetween transversely of depressions in the member, the gauge and member being so related that, during such movement, the magnitude of the gauge output exhibits an increase when the gauge is over a depressed region of the member, and a decrease over a raised region.

The error signal from the error indicator 28 and the size signal from the size indicator 38 are passed to an error recorder 40 which makes a continuous recording of the magnitude of the errors in the machining of the workpiece 10 concurrent with the size of the workpiece 10 as the latter is machined.

FIG. 2 illustrates diagrammatically an embodiment of the present invention in a boring machine. A workpiece 110 is mounted for rotation in a workpiece holder (not shown) about an axis 0 in the direction indicated by arrow B. A cross feed drive for the tool holder 111 is indicated by a chain-dotted line 112 and is such that a tool 113 mounted in the tool holder 111 may be advanced or retracted thereby to machine a bore internally in the workpiece 110. Means (not shown) may be provided for adjusting the position of the tool 113 relative to the tool holder 111 similar to that described above with reference to FIG. 1.

Two proximity gauges 120, 121 are mounted on support members 122, 123, respectively, at opposite ends of an internal diameter of the bore in the workpiece 110. The proximity gauges 120, 121 may be similar to the gauges 20, 21 of the embodiment described above with reference to FIG. 1. In this embodiment, however, a fluid pressure output signal is provided by each of the proximity gauges 120, 121 and the signals are passed via respective conduits 125, 126 to a summing device 127, which may, for example, be a fluid jet element in which the sum of the two output signals acts as a control pressure for controlling the position of a fluid jet. An application of a fluid jet element to proximity gauges is described U.K. Pat. No. 1,088,085.

The summing device 127 produces an error signal which is indicated by an error indicator 128.

As in the embodiment of FIG. 1, a displacement transducer 134 is provided for indicating movement of the support members 122, 123 one relative to the other and for providing a displacement signal which is passed to a size indicator 138 for providing a continuous indication of the distance between the proximity gauges 120, 121 and, therefore, in the absence of an error signal, of the size of the bore in the workpiece 110. The concurrent readings of the size indicator 138 and error indictor 128 are recorded by a recording device 130. The size indicated by the size indicator 138 can, of course, be corrected to give a true value by appropriately adding or subtracting the distance value of the error signal to or from the indicated size value.

A suitable screw-thread connection is provided between the cross feed drive 112 and the two proximity gauge support members 122, 123 to ensure that the latter move towards and away from each other in unison with retracting and advancing movements reseptively of the tool holder 111.

A servo-system (not shown) may also be provided for controlling the position of the tool 113 relative to the tool holder 111 in dependence on the magnitude of the error signal produced by the summing device 127, as described with reference to FIG. 1 embodiment.

We claim:
1. Machine tool apparatus comprising:
   a tool,
   a holder for said tool,
   a workpiece holder adjusted to hold a workpiece and to rotate the workpiece relative to said tool held in said tool holder;
   first and second fluid pressure proximity gauges so disposed that each of the gauges senses a different portion of the workpiece surface;
   each of said proximity gauges being adapted to provide an output signal indicative of the distance between itself and the portion of the workpiece surface sensed by it;
   means adapted to utilise said output signals and to provide indications of errors in the size of the workpiece;
   and means adapted to interconnect said tool holder and said proximity gauges whereby the proximity gauges are advanced towards said workpiece in unison with advancement of the tool holder towards the workpiece and in distances between the proximity gauges and the workpiece surface are maintained substantially constant.

2. Machine tool apparatus as claimed in claim 1, including:
   means adapted to control the position of said tool in said tool holder in dependence upon an error signal derived from said means utilising said output signals of said proximity gauges.

3. Machine tool apparatus as claimed in claim 1, wherein:
   said means adapted to utilise said output signals is adapted to sum the said output signals and to compare said summed signals with a reference signal to produce an error signal.

4. Machine tool apparatus as claimed in claim 1, wherein:
   said means adapted to interconnect said tool holder and said proximity gauges comprises:
      at least one flexible tensile force transmitting member connected to said proximity gauges and said tool holder.

5. Machine tool apparatus as claimed in claim 1, including:
   a cross feed for said tool holder; and wherein said means adapted to interconnect said tool holder and said proximity gauges comprises:
      screw-threaded drive means between said cross feed and said proximity gauges.

6. Machine tool apparatus as claimed in claim 1, including:
   displacement transducer means connected to said proximity gauges and adapted to provide a continuous indication of the distance between said proximity gauges.

7. Machine tool apparatus, comprising:
   a tool;
   a holder for said tool;
   a workpiece holder adapted to hold a workpiece and to rotate the workpiece relative to said tool held in said tool holder;
   first and second fluid pressure proximity gauges so disposed that, each of the gauges senses a different portion of the workpiece surface;
   each of said proximity gauges being adapted to provide an output signal indicative of the distance between itself and the portion of the workpiece surface sensed by it;
   displacement transducer means connected to said proximity gauges and adapted to provide a continuous indication of the distance between said proximity gauges;
   means adapted to utilise said output signals and to provide indications of errors in th size of the workpiece;
   means adapted to control the position of said tool in said tool holder in dependence upon an error signal derived from said means utilising said output signals of said proximity gauges; and
   means adapted to interconnect said tool holder and said proximity gauges whereby sthe proximity gauges are advance towards said workpiece in unison with advancement of the tool holder towards the workpiece and the distances between the proximity gauges and the workpiece surface are maintained substantially constant.

8. Machine tool apparatus as claimed in claim 7 wherein:
   said means adapted to interconnect said tool holder and said proximity gauges comprises:
      at least one flexible tensile force transmitting member connected to said proximity gauges and said tool holder.

9. Machine tool apparatus as claimed in claim 7, including:
   a cross feed for said tool holder; and wherein
   said means adapted to interconnect said tool holder and said proximity gauges comprises:
      screw-thread drive means between said cross feed and proximity gauges.

References Cited

FOREIGN PATENTS

| 904,730 | 9/1960 | Great Britain. |
| 491,415 | 3/1954 | Italy. |

LEONIDAS VLACHOS, Primary Examiner

U.S. Cl. X.R.

82—24, 34